US012008788B1

(12) United States Patent
Li et al.

(10) Patent No.: US 12,008,788 B1
(45) Date of Patent: Jun. 11, 2024

(54) EVALUATING SPATIAL RELATIONSHIPS USING VISION TRANSFORMERS

(71) Applicant: Amazon Technologies, Inc., Seattle, WA (US)

(72) Inventors: Kun Li, Sammamish, WA (US); Pragyana K. Mishra, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 422 days.

(21) Appl. No.: 17/501,555

(22) Filed: Oct. 14, 2021

(51) Int. Cl.
*G06T 7/73* (2017.01)
*G06N 3/04* (2023.01)
*G06N 3/08* (2023.01)
*G06N 20/10* (2019.01)
*G06T 7/33* (2017.01)

(52) U.S. Cl.
CPC ............. *G06T 7/74* (2017.01); *G06N 3/04* (2013.01); *G06N 3/08* (2013.01); *G06N 20/10* (2019.01); *G06T 7/337* (2017.01)

(58) Field of Classification Search
CPC .......... G06T 7/74; G06T 7/337; G06N 20/10; G06N 3/04; G06N 3/08
USPC ........................................................ 382/156
See application file for complete search history.

(56) References Cited

U.S. PATENT DOCUMENTS

| | | | | |
|---|---|---|---|---|
| 10,816,978 B1* | 10/2020 | Schwalb | ................ | G08G 1/012 |
| 10,997,433 B2* | 5/2021 | Xu | ....................... | G05D 1/0221 |
| 11,151,744 B1* | 10/2021 | Konolige | ................... | G06T 7/74 |
| 11,170,299 B2* | 11/2021 | Kwon | ................... | G06F 18/2155 |
| 11,182,916 B2* | 11/2021 | Yang | ...................... | G06V 10/70 |
| 11,308,338 B2* | 4/2022 | Yang | ...................... | G06N 3/045 |
| 11,436,837 B2* | 9/2022 | Pham | ..................... | G06F 18/24 |
| 11,508,049 B2* | 11/2022 | Seo | ........................ | G06F 18/217 |
| 11,520,345 B2* | 12/2022 | Onofrio | ............... | G05D 1/0223 |
| 11,579,629 B2* | 2/2023 | Wu | .......................... | G06V 10/82 |
| 11,604,944 B2* | 3/2023 | Park | ......................... | G06V 10/764 |
| 11,613,201 B2* | 3/2023 | Li | .......................... | G06V 20/56 315/82 |
| 11,636,668 B2* | 4/2023 | Jampani | .................. | G06T 7/174 382/156 |
| 11,648,945 B2* | 5/2023 | Sajjadi Mohammadabadi | .......... | G06F 18/251 382/104 |
| 11,651,215 B2* | 5/2023 | Park | ....................... | G06V 10/46 382/103 |

(Continued)

OTHER PUBLICATIONS

Maya Aghaei, Matteo Bustreo, Yiming Wang, Gianluca Bailo, Pietro Morerio, and Alessio Del Bue. "Single image human proxemics estimation for visual social distancing," Pattern Analysis & Computer Vision (PAVIS), Dated Nov. 5, 2020, pp. 1-14.

(Continued)

*Primary Examiner* — William D Titcomb
(74) *Attorney, Agent, or Firm* — Eversheds Sutherland (US) LLP

(57) ABSTRACT

Techniques for detection of spatial relationships are provided. An input image is divided into a set of patches, and a first feature tensor is generated for a first patch of the set of patches. The first feature tensor is processed using an attention mechanism to generate a first transformed feature tensor, and a classification indicating distancing between physical entities in the input image is generated based at least in part on the first transformed feature tensor.

20 Claims, 9 Drawing Sheets

(56) References Cited

U.S. PATENT DOCUMENTS

| | | | | |
|---|---|---|---|---|
| 11,657,532 | B2* | 5/2023 | Park | G06V 20/58 |
| | | | | 382/103 |
| 11,688,181 | B2* | 6/2023 | Park | G06N 3/084 |
| | | | | 382/104 |
| 11,801,861 | B2* | 10/2023 | Choe | B60W 50/06 |
| 2016/0350336 | A1* | 12/2016 | Checka | G06V 10/454 |
| 2016/0358038 | A1* | 12/2016 | Jaderberg | G06V 10/454 |
| 2017/0228633 | A1* | 8/2017 | Danihelka | G06N 3/084 |
| 2019/0102668 | A1* | 4/2019 | Yao | G06N 3/04 |
| 2019/0179979 | A1* | 6/2019 | Melick | G06F 30/367 |
| 2021/0082181 | A1* | 3/2021 | Shi | G06V 10/764 |
| 2021/0279811 | A1* | 9/2021 | Waltman | G06T 7/0002 |
| 2022/0222889 | A1* | 7/2022 | Bhargava | G06T 19/20 |

OTHER PUBLICATIONS

Lorenzo Bertoni, Sven Kreiss, and Alexandre Alahi. "Monoloco: Monocular 3d pedestrian localization and uncertainty estimation." In 2019 IEEE/CVF International Conference on Computer Vision (ICCV), pp. 6860-6870, 2019.

Alexey Dosovitskiy, Lucas Beyer, Alexander Kolesnikov, Dirk Weissenborn, Xiaohua Zhai, Thomas Unterthiner, Mostafa Dehghani, Matthias Minderer, Georg Heigold, SylvainGelly, Jakob Uszkoreit, and Neil Houlsby. An image is worth 16×16 words: Transformers for image recognition at scale. arXiv preprint arXiv:2010.11929, 2020.

Kaiming He, Xiangyu Zhang, Shaoqing Ren, and Jian Sun.Deep residual learning for image recognition. In 2016 Conference on Computer Vision and Pattern Recognition (CVPR), pp. 770-778, 2016.

Liqin Huang, Ting Zhe, Junyi Wu, Qiang Wu, Chenhao Pei, and Dan Chen. Robust inter-vehicle distance estimation method based on monocular vision. IEEE Access, 7:46059-46070, 2019.

Andr'e Ibisch, Stefan Stumper, Harald Altinger, Marcel Neuhausen, Marc Tschentscher, Marc Schlipsing, Jan Salinen, and Alois Knoll. Towards autonomous driving in a parking garage: Vehicle localization and tracking using environment-embedded lidar sensors. In 2013 IEEE Intelligent Vehicles Symposium (IV), pp. 829-834, 2013.

Giseok Kim and Jae-Soo Cho. Vision-based vehicle detection and inter-vehicle distance estimation. In 2012 12th International Conference on Control, Automation and Systems, pp. 625-629, 2012.

Ze Liu, Yutong Lin, Yue Cao, Han Hu, Yixuan Wei, Zheng Zhang, Stephen Lin, and Baining Guo. Swin transformer: Hierarchical vision transformer using shifted windows, 2021.

Weixin Lu, Yao Zhou, Guowei Wan, Shenhua Hou, and Shiyu Song. L3-net: Towards learning based lidar localization for autonomous driving. In Proceedings of the IEEE/CVF Conference on Computer Vision and Pattern Recognition (CVPR), Jun. 2019.

David Rendleman and Prag Mishra. Large-scale vision analytics for amazon's surveillance camera network. AMLC, 2015.

Karen Simonyan and Andrew Zisserman. Very deep convolutional networks for large-scale image recognition. arXiv preprint arXiv:1409.1556, 2014.

Mingxing Tan and Quoc V. Le. Efficientnet: Rethinking model scaling for convolutional neural networks. CoRR, abs/1905.11946, 2019.

Ekim Yurtsever, Jacob Lambert, Alexander Carballo, and Kazuya Takeda. A survey of autonomous driving: Common practices and emerging technologies. IEEE Access, 8:58443-58469, 2020.

Quanwen Zhu, Long Chen, Qingquan Li, Ming Li, Andreas Nüchter, and Jian Wang. 3d lidar point cloud based intersection recognition for autonomous driving. In 2012 IEEE Intelligent Vehicles Symposium, pp. 456-461, 2012.

* cited by examiner

EVALUATING SPATIAL RELATIONSHIPS USING VISION TRANSFORMERS

BACKGROUND

The present disclosure relates to machine learning, and more specifically, to using vision transformers to evaluate spatial relationships.

Understanding the spatial relationships (which may include three-dimensional poses) between different objects is important in a wide variety of applications. This is particularly true in applications that involve scene understanding, object manipulation, autonomous movement or driving, and the like. For example, in autonomous driving, the system may need to ascertain spatial distances and orientations with respect to other objects so that obstacles and humans can be avoided. In working areas, items and tools may need to be stowed away in designated areas so work can be performed efficiently, effectively, and safely. Similarly, tools and containers may need to be arranged optimally and ergonomically such that they can be efficiently used. All these applications, and others, require the estimation of inter-object three-dimensional spatial relationships—the spatial distance and orientation between various objects.

Ascertaining the three-dimensional relationships between objects often requires use of sensors such as cameras or range scanners. In some conventional systems, complex three-dimensional scanners are available to aid the process. However, these devices are often expensive and complex, rendering them impractical for wide use. For example, if one wishes to determine spatial relationships for large swathes of areas (e.g., across a number of warehouses), these three-dimensional systems are impractical as they do not scale well. To minimize costs while maximizing coverage, some imaging networks use monocular two-dimensional cameras. However, the two-dimensional images produced by such cameras often make it difficult or impossible to efficiently determine spatial relationships in the three-dimensional world.

Some conventional vision-based solutions have been proposed for solving such three-dimensional spatial-relationship problems using two-dimensional images. Generally, these solutions first identify the objects in the two-dimensional images (using convolutional neural networks (CNNs), or with natural or artificially added visual features, such as markers), and then use the calibrated cameras to map the two-dimensional information in images to three-dimensional information in the space based on things like the size of the markers or objects, known depth cues, or a stereo camera/depth scanner. The three-dimensional object relationships can then be determined. However, these conventional solutions work well only when there are a small number of objects and a small number of cameras, as the system requires significant manual effort (e.g., calibrating cameras, affixing markers or patterns to objects and parts of scenes, careful metric reconstruction, and the like) for each new deployment.

DETAILED DESCRIPTION

Embodiments of the present disclosure provide techniques to identify and evaluate spatial relationships between objects in a physical space, as depicted in monocular two-dimensional images, using vision transformers.

In an embodiment, the vision transformer-based approach described herein involves using a machine learning tools to detect objects in each local region of an input image, and to estimate or evaluate the spatial relationships between these objects. In some aspects, the objects are detected using convolutional operations, and the spatial relationships across regions are determined using attentional operations In some embodiments, the system can first split or delineate input images into multiple patches. A feature vector can then be extracted for each such patch using a feature extractor (e.g., using convolution). In an embodiment, each patch can then gather information of the other patches via an attention operation. In some embodiments, for a given patch, the attention mechanism can first compute an attention matrix based on the query of given patch and the keys of all other patches. It can then multiply the attention matrix with the values of all other patches in order to gather information from the other patches, and transform the feature tensor of the given patch based on this information, as discussed in more detail below.

In this way, each transformed feature tensor encodes the spatial relationships of the given patch with the other patches. In some aspects, these transformed tensors can then be classified (e.g., using a trained classifier) to perform a desired task, such as determining whether the image depicts appropriate object positioning (e.g., whether tools are placed in designated areas), entity spacing (e.g., whether people in the image are appropriately spaced apart), and the like. Though the physical distance between individual people is used in some examples herein for conceptual clarity, it is to be understood that aspects of the present disclosure are readily applicable to a wide variety of tasks involving spatial reasoning with respect to physical entities (including people, objects, vehicles, and the like) depicted in input images. Additionally, though some examples herein involve evaluating distance between individual people, in some embodiments, the system can similarly determine spacing between groups of people or other physical entities (e.g., between a group of two or more people, and a second group of one or more people).

Figure 1:
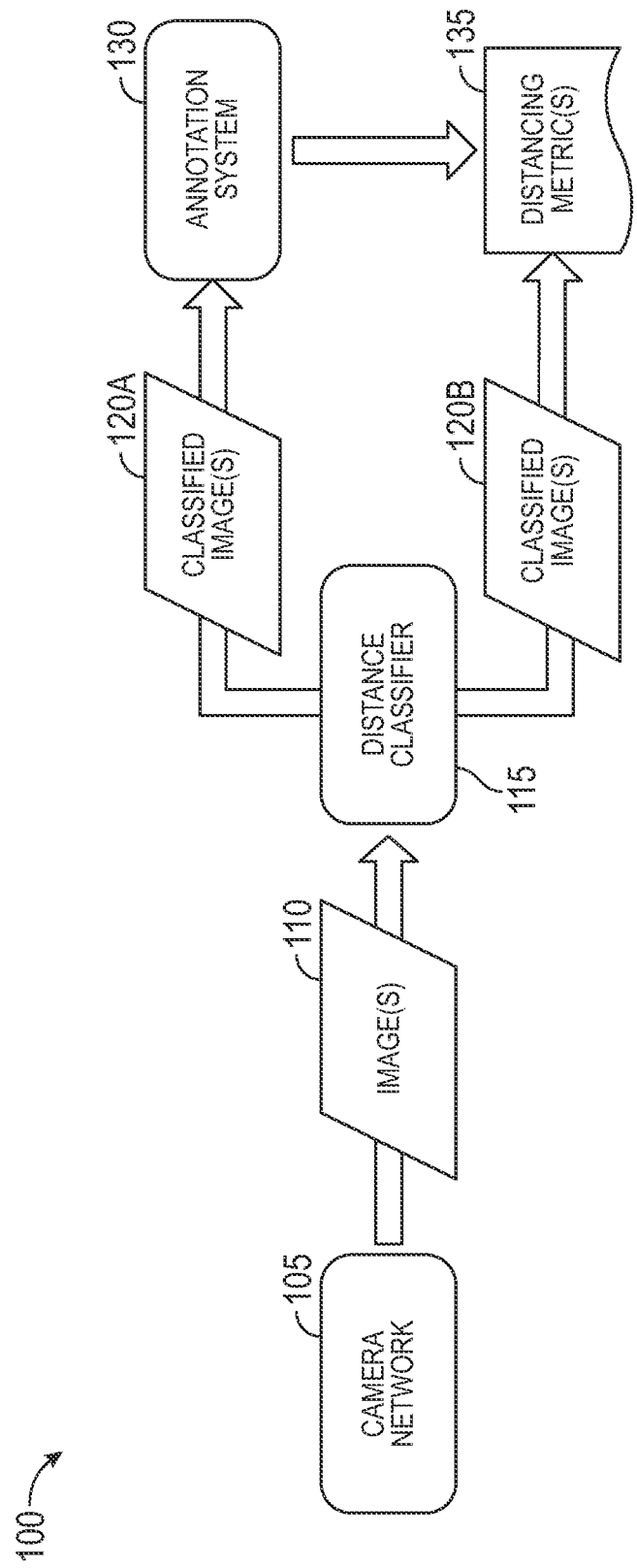
FIG. 1 depicts an example workflow for processing images to evaluate spatial relationships, according to some embodiments described herein.

FIG. 1 depicts an example workflow 100 for processing images to evaluate spatial relationships, according to some embodiments described herein.

In the illustrated workflow 100, a set of images 110 are received from a camera network 105. In an embodiment, the camera network 105 generally includes one or more imaging sensors (such as cameras) arranged to capture images 110 in one or more physical areas. For example, the camera network 105 may include cameras dispersed throughout a building (e.g., a manufacturing facility, a shipping facility, a storage facility, and the like). Though a single camera network 105 is depicted for conceptual clarity, it is to be understood that the cameras need not be on the same network. For example, the camera network 105 may collectively represent a number of cameras in a number of different areas (e.g., multiple storage facilities in different geographic locations).

The images 110 are generally two-dimensional images, in that they have a width and a height greater than zero, but do not indicate the depth of the objects in the image. In various aspects, the images 110 may be black and white, grayscale, or color (e.g., RGB color). In some embodiments, the images 110 can include fisheye images (e.g., captured by cameras with ultra-wide angle lenses), as well as images without such distortion.

In some embodiments, the camera network 105 captures images 110 periodically. For example, each camera may be configured to capture a still image every N seconds, where N may be defined separately for individual cameras or locations. In some embodiments, one or more of the imaging sensors in the camera network 105 may capture video comprising a sequence of images 110. In at least one embodiment, only a subset of the captured images are used in the workflow 100. That is, the camera network 105 may generate a number of images, and the system may only include a subset of these in the images 110. For example, one or more cameras may record video for various purposes (e.g., security, safety, and the like), and the system may sample frames from the video (e.g., one frame every six seconds) for inclusion in the images 110.

As illustrated, the images 110 are provided to a distance classifier 115 for evaluation. In some embodiments, the images 110 are processed by the distance classifier 115 as they become available. For example, each time a new image 110 is captured and transmitted to the system, it may be immediately processed using the distance classifier 115. In some aspects, the images 110 can be processed periodically (e.g., in batches).

The distance classifier 115 is generally a machine learning model that is trained to evaluate and classify input images based on the spatial relationships between objects depicted in the images. In some embodiments, the distance classifier 115 also assigns a confidence value to its classification (or to each class). As one example, the distance classifier 115 may identify specific objects (such as pallet jacks, trash cans, vehicles, and the like), and determine whether they are appropriately positioned. For example, the classifications can be used to determine whether tools or other objects have been placed in a defined space or area (e.g., out of a walkway), whether vehicles or equipment (such as forklifts) are maintaining a safe distance between each other and from people, and the like.

In one embodiment, the distance classifier 115 may identify humans depicted in the input image 110, and classify the image 110 based on whether the humans are maintaining appropriate physical distance from each other (e.g., greater than six feet). For example, the image 110 (or portions thereof) may be classified into a category indicating the spacing, such as an "appropriate distance" or AD category indicating appropriate spacing, a "reduced distance" or RD category indicating that the people are closer than the threshold spacing, a "cannot tell" or CT category indicating that the distance classifier 115 is unable to determine whether spacing is appropriate, and a "less than two" or LT category indicating that the region depicts less than two individuals (e.g., zero or one).

In embodiments, the distance classifier 115 uses vision transformers to perform the classification, as discussed in more detail below. The vision transformers may generally use convolution operations to detect objects in each local region of the input image 110, and estimate the spatial relationships using self-attention operations. In some aspects, the spatial relationships include not only the physical location of the objects in three-dimensional space, but also their relative poses (e.g., the directions they are facing).

In the illustrated workflow 100, the images are then sorted based on their classifications. For example, a first set of classified images 120A may be provided to an annotation system 130, while a second set of classified images 120B are used to directly determine a set of distancing metrics 135. In some embodiments, the classified images 120B correspond to those that are classified as depicting "appropriate distance" with a sufficiently high confidence. The remaining images (e.g., those classified as "reduced distance," "cannot tell," or "less than two," as well as those classified as "appropriate distance" but with a confidence value below the threshold) may be included in the set of classified images 120A.

In some embodiments, the annotation system 130 may include further evaluation or processing to verify the classification assigned by the distance classifier 115. For example, in some aspects, the annotation system 130 includes one or more additional machine learning models. In some aspects, the annotation system 130 includes a manual review process, where one or more human users review the classified images 120A and assign the appropriate classification. In at least one embodiment, some or all of the classified images 120A may be used to retrain or refine the distance classifier 115 after they have been labeled in the annotation system 130 periodically (e.g., daily) or upon satisfaction of other criteria (such as when the accuracy of the model falls below defined thresholds). This can enable continuous improvement in an online fashion. As illustrated, the classified images 120A with annotations from the annotation system 130 are then used to determine the set of distancing metrics 135.

In various embodiments, the distancing metrics 135 can be generated and updated continuously or periodically. In an embodiment, the distancing metrics 135 can generally correspond to a wide variety of aggregated data that indicates various aspects of the distancing reflected in the images 110. For example, the distancing metrics 135 may include a percentage of the images that fall into each category, a percentage of the time that the distancing is appropriate or inappropriate, an indication of specific time(s) of day or day(s) of the week when the distancing criteria are consistently violated, and the like. Similarly, the distancing metrics 135 may include region-specific metrics, such as an indication as to which physical location(s) commonly violate the distancing criteria, which areas generally include or allow for appropriate distancing, and the like.

In some embodiments, the distancing metrics 135 (or the individual classified images 120) can be used to drive or trigger a wide variety of actions, such as generation and output of an alert or instruction. For example, if a classified image 120 indicates a violation of the distancing criteria, the system may output an alert or notification in the location where the violation is occurring (e.g., on a display, via audio, and the like) to instruct individuals in the area to remedy the distancing violation. As another example, if the distancing metrics 135 indicate that some areas consistently include distancing violations, the system may output general reminders or instructions in these areas, trigger a meeting to discuss the areas, suggest or trigger changes to the area to enable appropriate distancing (e.g., rearranging objects to allow for more spacing), and the like.

Figure 2:
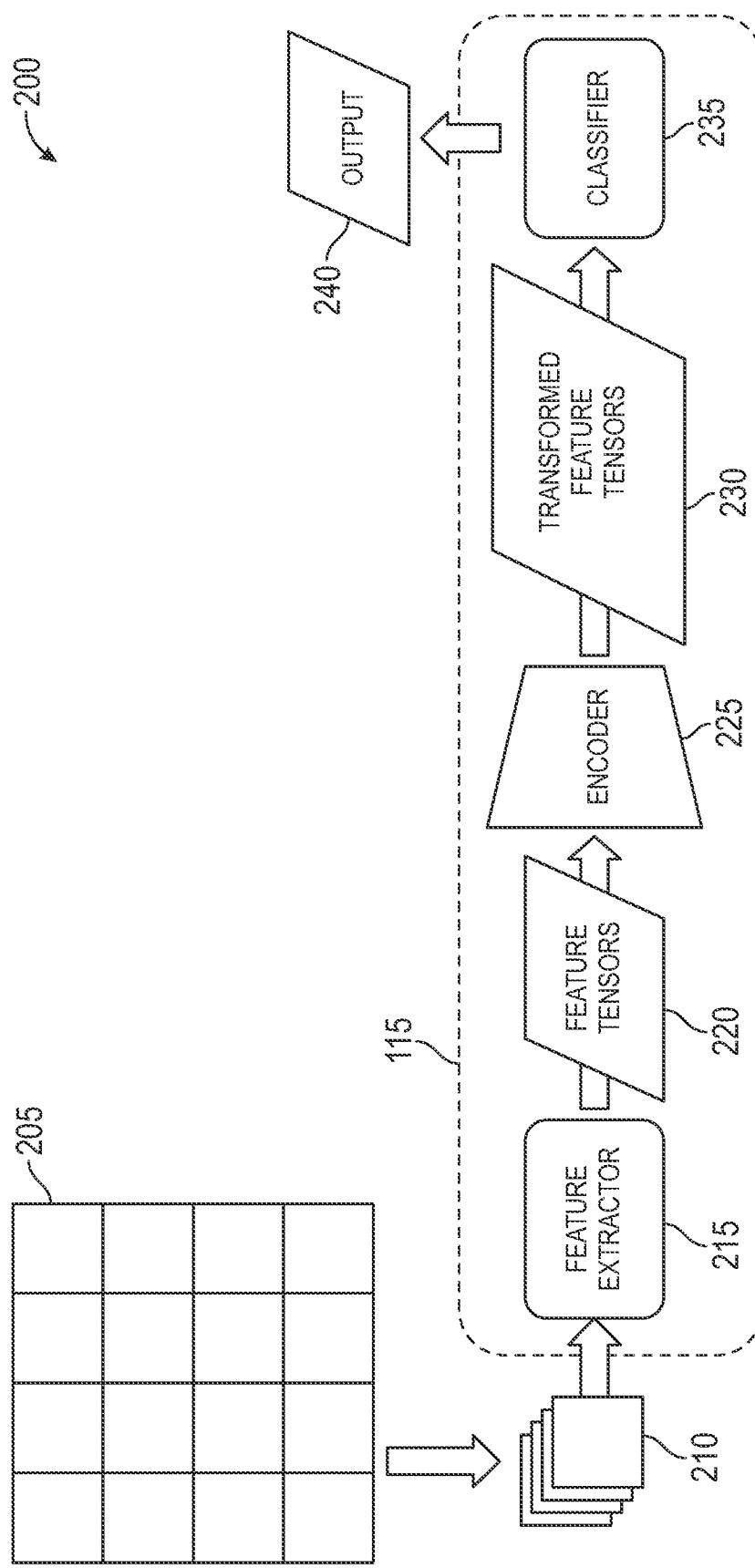
FIG. 2 depicts an example workflow for processing images using a distance classifier, according to some embodiments described herein.

FIG. 2 depicts an example workflow 200 for processing images using a distance classifier, according to some embodiments described herein. In one embodiment, the workflow 200 includes more detail for the operations of the distance classifier 115, discussed above with reference to FIG. 1.

In the illustrated workflow 200, an input image 205 is received for processing. Although depicted as a square image 205, in some aspects, the input images may be other shapes (e.g., rectangular). In at least one embodiment, if the image is not square, the system can pre-process it to make it square (e.g., by cropping it, by resizing it, and the like). As indicated by the grid lines, the system can divide, split, or otherwise delineate the image 205 into a set of patches 210. In some embodiments, this delineation is defined by fixed criteria. For example, the system may split the image 205 into patches that are 16 pixels wide and 16 pixels tall (e.g., into 16×16 patches).

The patches 210 are then provided to the distance classifier 115. Although the illustrated workflow 200 depicts the image 205 being split into patches 210 prior to being provided to the distance classifier 115 for conceptual clarity, in some aspects, these pre-processing steps may be performed within the distance classifier 115.

As illustrated, the patches 210 are first processed using a feature extractor 215 to generate a set of feature tensors 220. The feature extractor 215 is generally a machine learning component that has been trained based on labeled exemplars to generate the feature tensors 220. Generally, each patch 210 is processed separately by the feature extractor 215 (sequentially or in parallel) to generate a corresponding feature tensor 220 (also referred to as a feature vector in some aspects). For example, if the input image 205 is a square 384 pixels wide and 384 pixels tall, and is divided into 16×16 patches (resulting in 576 patches 210), the feature extractor 215 will generate 576 feature tensors 220.

In some embodiments, the feature extractor 215 corresponds to one or more convolution operations (e.g., in a CNN). In at least one embodiment, the feature extractor 215 generates the feature tensors 220 by applying one or more convolution kernels to each patch 210. The convolution kernel(s) are generally trained during training of the distance classifier 115. That is, the weights, biases, or other parameters of the kernel are learned based on labeled training data, as discussed in more detail below. In an embodiment, as a result of the training process, the kernel(s) generate higher values in the feature tensors 220 for patches that include the relevant training object(s) (e.g., humans).

In some embodiments, this convolution process involves applying a kernel smaller than the patch 210, striding the kernel across the patch to cover a new set of pixels, and applying it again until the entire patch 210 has been evaluated. In at least one embodiment, the convolution operation involves a single application of a kernel that is the same size as the patch 210. For example, if the patches are 16×16, the feature extractor 215 may apply a 16×16 kernel to each patch 210 to generate a corresponding feature tensor 220. In some embodiments, the same kernel is used for all patches 210. In other embodiments, each patch 210 may be processed using a different kernel (e.g., based on the patch's location in the original input image 205).

In some embodiments, as discussed above, the input images 205 may have varying characteristics. For example, some images may be fisheye, while some are not. Some may be black and white, while others are RGB color. Generally, the techniques described herein are agnostic with respect to the characteristics or attributes of the camera(s) or image(s). That is, the system operates accurately and efficiently regardless of the pose or configuration of the cameras, and regardless of whether they capture distorted images (e.g., with a fisheye lens), color images, black and white images, and the like. In some embodiments, a different kernel (or a different distance classifier 115) can be used to process the images, based on the characteristics of the image. For example, fisheye images may be processed with a model trained for such fisheye images. In at least one embodiment, however, the same distance classifier 115 (with the same parameters) can be used for all images, regardless of the characteristics. That is, the system may process all patches using the same convolution kernel, regardless of whether the image was obtained by an ultra-wide angle lens or not.

In the illustrated workflow 200, the feature tensors 220 are then provided to an encoder 225. The encoder 225 is generally a machine learning component that has been trained based on labeled exemplars to transform the feature tensors 220 based on the spatial relationships between the patches. In at least one embodiment, the encoder 225 uses an attention mechanism, discussed in more detail below. Although not included in the illustrated example, in some aspects, the distance classifier 115 appends or prepends a learned class token to each feature tensor 220 prior to processing them using the encoder 225. In some aspects, this is performed within the feature extractor 215.

Generally, the class token corresponds to one or more values that are learned during training and fine-tuning of the distance classifier 115 based on the ground-truth classification of each patch. In one embodiment, each patch location in the image is associated with a corresponding learned class token. For example, the top-left patch has a first class token, while the bottom-right patch has a second. In some embodiments, however, a single class token is used for all patches. During training and inferencing, these class tokens can gather information from the other patches (using the attention mechanism discussed below in more detail) to enable accurate and efficient classification.

In some embodiments, the encoder 225 includes a positional embedding layer (that embeds or modifies each feature tensor 220 based on its position in the original input image 205), as well as one or more layers of attention blocks, as discussed below in more detail. The attention mechanism generally allows each feature tensor 220 to be modified based on the other feature tensors 220 in the batch. As a result of this processing, the encoder 225 outputs a set of transformed feature tensors 230, one for each input feature tensor 220.

As illustrated, the transformed feature tensors 230 are then provided to a classifier 235, which generates an output 240. The classifier 235 is generally a machine learning component that has been trained based on labeled exemplars to classify the transformed feature tensors 230 into classes. For example, in some aspects, the classifier 235 is a multi-layer perceptron (MLP). In at least one embodiment, rather than processing the entire transformed feature tensor 230, the classifier 235 evaluates only the class token (which was transformed by the encoder 225) of each transformed feature tensor 230.

In some embodiments, the output 240 corresponds to a classification for each transformed feature tensor 230 (e.g., for each patch 210 in the input image 205). The output 240 may also include a confidence value for each classification/patch. Including a classification for each patch may allow granular evaluation of the image 205. For example, the image 205 may be output on a display, with regions of the image labeled, highlighted, colored, or otherwise modified to indicate the corresponding classification of each patch.

In some embodiments, the output 240 additionally or alternatively indicates a collective classification for the image 205. For example, if all of the patch classifications are "appropriate distance," the output 240 may indicate that the image depicts appropriate distancing. In one embodiment, if at least one of the patches is not classified as "appropriate distance," (or is classified with a confidence below a threshold), the output 240 may indicate that the image 205 does not (or may not) depict appropriate distancing.

In some embodiments, the workflow 200 is performed in real-time or near real-time, allowing the classifications to be output shortly after the image is captured. For example, as images 205 are received, they can be processed and output on a display in the area, including the corresponding classifications, in near real-time, allowing for immediate identification and remediation of any distancing or spatial concerns.

Although not included in the illustrated example, during training, the output 240 may be compared against a ground-truth label (e.g., provided by a human user) in order to generate a loss that is used to refine the distance classifier 115. This label may be a single label for the image (e.g., indicating whether the distancing is appropriate) or may include patch-specific labels (e.g., indicating the distancing for each patch). One example of training the distance classifier 115 is discussed in more detail below with reference to FIG. 6.

Figure 3:
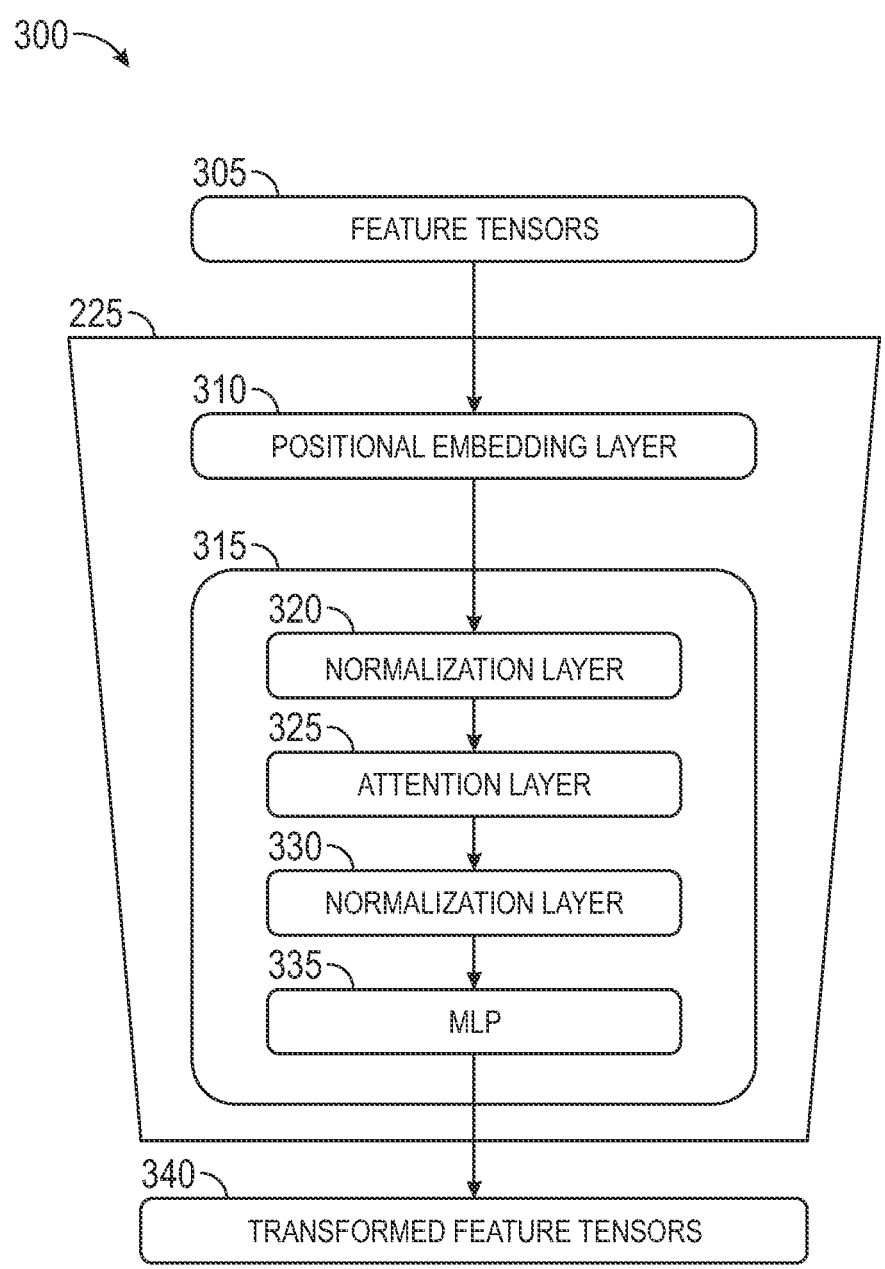
FIG. 3 depicts an example architecture for a vision transformer using a distance classifier, according to some embodiments described herein.

FIG. 3 depicts an example architecture 300 for a vision transformer used in a distance classifier, according to some embodiments described herein. In one embodiment, the architecture 300 includes more detail for the encoder 225, discussed above with reference to FIG. 2.

In the illustrated example, feature tensors 305 (e.g., generated by the feature extractor 215 of FIG. 2), are first processed by a positional embedding layer 310. In some embodiments, these feature tensors 305 already have class tokens embedded. In others, the encoder 225 can add these tokens. The positional embedding layer 310 is generally trained to embed positional information for each patch into the feature tensor. That is, the positional embedding layer 310 learns to modify the feature tensors to incorporate information relating to the original position of the corresponding patch (that was used to generate the feature tensor 305) in the original input image. This positional embedding layer 310 can thereby ensure that the attention mechanism includes consideration of the position of each patch.

In the architecture 300, the (modified) tensors are then passed to an attention block 315. In the illustrated example, the attention block 315 includes a normalization layer 320, an attention layer 325, another normalization layer 330, and an MLP layer 335. In an embodiment, each of these components are trained based on labeled exemplars, as discussed in more detail below.

In embodiments, the normalization layers 320 and 330 can include a variety of normalization or standardization operations, including batch normalization, weight normalization, layer normalization, or group normalization. Generally, the normalization layers 320 and 330 are used to standardize the associated input tensors, such as to ensure they have approximately zero mean and variance.

The attention layer 325 is used to provide the attention mechanism discussed above. Specifically, the attention layer 325 may be used to modify each feature tensor based on all the other feature tensors in the set. That is, for each patch, the corresponding feature tensor is modified based on the feature tensors of all the other patches in the input image.

In at least one embodiment, the attention layer 325 is a self-attention mechanism that utilizes a query, key, value system. In one such embodiment, the attention layer 325 generates three embedding matrices for each patch based on the corresponding feature tensor: a query matrix, a key matrix, and a value matrix. To do so, the attention layer 325 may multiply the feature tensor (which, as discussed above, may be modified by one or more prior components, such as to include a class token, positional embedding, and the like) using a learned query weight matrix, key weight matrix, and value weight matrix. These weight matrices generally specify a set of weights that are learned during the training process, as discussed in more detail below. In some embodiments, the attention layer 325 learns a different set of weight matrices for each patch (e.g., for each patch position) in the input.

Once a query matrix, key matrix, and value matrix has been generated for each patch (e.g., for each input feature tensor 305) (either sequentially or in parallel), the attention layer 325 can compute the attention for each patch with respect to every other patch. In at least one embodiment, the attention a for an index patch i with respect to a target patch j is defined based on the query matrix of the index patch $Q_i$, the key matrix of the target patch $K_j$, and the value of the target patch $V_j$ using Equation 1, below.

$$a = \text{softmax}(Q_i * K_j) * V_j \quad (1)$$

Although Equation 1 uses a softmax operation, in embodiments, other activation functions can be used in place of the softmax. Additionally, in some embodiments, the attention layer 325 can compute an attention tensor or vector not only with respect to each other patch (other than the index patch) but also with respect to the index patch itself (e.g., using Equation 1, using the index patch as both patch i and patch j). Once the process has been repeated to compute the attention for the index patch with respect to all other patches, the attention layer 325 can aggregate the generated attentions to yield a transformed tensor for the patch. This transformed tensor may encode spatial information with respect to the objects and the other patches, as discussed above. Generally, the attention layer 325 can perform this attention operation for all of the patches (e.g., on each input tensor). In some embodiments, this aggregation uses a set of one or more learned weights to allow the attention layer 325 to combine the attention tensors with respect to each patch in a learnable way. For example, the system may perform element-wise summation after weighting each element of each tensor using learned parameter(s).

The MLP 335 of the attention block 315 is then used to process the transformed (attention) tensor of each patch based on its prior training. Generally, the MLP 335 can further modify the transformed feature tensors to improve the accuracy of the overall model. In some embodiments, the MLP 335 reduces the size of the tensor (e.g., by selecting some subset of the features). Because the MLP 335 is refined based on labeled exemplars during training, it can thereby learn to select the salient or relevant features for processing. The tensors then exit the attention block 315.

Although the illustrated example includes a single attention block 315 for conceptual clarity, in some aspects, multiple attention blocks 315 may be used. For example, the encoder 225 may include a stack of multiple attention blocks 315 (e.g., twelve blocks) stacked sequentially, such that the output of the first attention block is provided as input to the second, and so on until the twelfth attention block outputs the transformed feature tensor 340 from the encoder 225.

Additionally, although not included in the illustrated example for conceptual clarity, in some aspects the attention block 315 includes one or more residual connections (e.g., a skip connections). For example, the attention block 315 may include a residual connection from prior to the normalization layer 320 to after the attention layer 325, allowing the original tensor input to the normalization layer 320 to be added to the output of the attention layer 325. Another residual connection may exist from after this aggregation point (before the normalization layer 330) to after the MLP 335.

As illustrated, the encoder 225 outputs a set of transformed feature tensor 340, one for each patch in the input. These transformed feature tensors 340 generally encode the spatial relationships of the detected objects in the image. They can then be used for a variety of spatial-related tasks, including classification of the corresponding patches, as discussed above.

Figure 4:
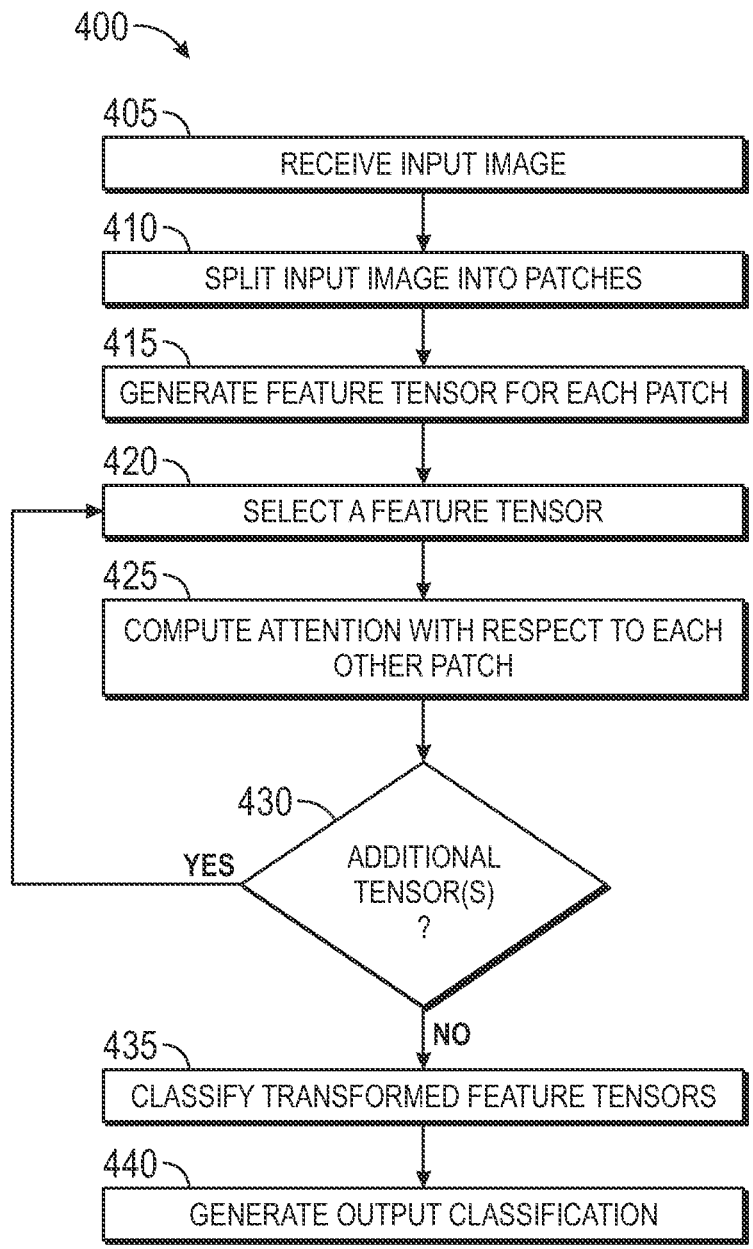
FIG. 4 is a flow diagram depicting an example method for processing images using a distance classifier, according to some embodiments described herein.

FIG. 4 is a flow diagram depicting an example method 400 for processing images using a distance classifier, according to some embodiments described herein. In some embodiments, the method 400 is performed using the distance classifier 115 of FIG. 1.

The method 400 begins at block 405, where an input image is received. For example, an image (such as image 110 in FIG. 1) may be captured by a camera (such as camera network 105 in FIG. 1) in a physical area and processed using the method 400 to classify it based on the spatial relationships between depicted objects. As discussed above, the received image may have a variety of characteristics. For example, the image may be black and white, full color, grayscale, and the like. Similarly, the image may be captured using a lens without distortion (or with little distortion), using an ultra-wide angle lens, and the like. Additionally, the image may generally be of any size and shape. In at least one embodiment, prior to processing, the image is resized to form a square of the appropriate dimensions for which the distance classifier was trained.

At block 410, the image is split into a set of patches. For example, as discussed above, the system may delineate the image into 16×16 patches, processing each separately. The method 400 then continues to block 415, where the system generates a respective feature tensor for each respective patch. In one embodiment, the system uses a trained feature extractor (e.g., the feature extractor 215 of FIG. 2) to generate the feature tensors. As discussed above, the feature tensors may generally encode or represent whether a target object (e.g., the objects that were labeled during the training phase) is included in the corresponding patch. In some aspects, as discussed above, a learned class token is also appended or prepended to the feature tensor of each patch.

At block 415, the system selects one of the generated feature tensors. This selection may be performed according to any suitable criteria, as the system will process all of the feature tensors during the method 400. Although an iterative process is depicted for conceptual clarity (processing a selected tensor, then selecting the next tensor and processing it), it is to be understood that these operations may be performed on multiple patches entirely or partially in parallel.

At block 420, the system computes the attention of the selected patch, with respect to all other patches in the input. For example, as discussed above with reference to FIG. 3, the system may determine or retrieve a set of three weight matrices (a key weight matrix, a query weight matrix, and a value weight matrix) that were learned during training. In some aspects, the same set of three weight matrices is used for all patches in the image. That is, the feature tensor of each patch is multiplied with the same three weight matrices to yield a query matrix, key matrix, and value matrix for the respective patch. In some embodiments, a separate set of weight matrices are learned for each input patch. That is, the feature tensor of a given patch may be multiplied with a corresponding set of weight matrices that were learned for the specific location or index of the given patch. In some embodiments, if multiple attention blocks are used, the system may also use a separate set of learned weight matrices within each attention block.

In some embodiments, to generate the attention between the selected patch and a second patch, as discussed above, the query matrix of the selected patch may be multiplied by the key matrix of the second patch. The system may then process this result using a softmax operation, and multiple the output of the softmax by the value matrix of the second patch. Although a softmax operation is used as one example, in embodiments, other activation functions can be used to define the attention. This process can then be repeated (in parallel or in sequence) for all other patches (as well as computing attention with respect to the index patch itself), and the resulting attentions can be aggregated to determine the overall attention (also referred to as a transformed feature tensor) for the selected patch.

At block 430, the system determines whether there are any additional feature tensors that have not yet been processed by the attention mechanism. If so, the method 400 returns to block 420. If all patches have been processed, the method 400 continues to block 435.

At block 435, the transformed feature tensors are classified. For example, using a trained classifier (such as classifier 235 of FIG. 2), each transformed feature tensor can be assigned to a respective class (such as AD, RD, CT, or LT, as discussed above). In some embodiments, as discussed above, the system can classify the tensor based on the class token. That is, the system may process only the class token using the classifier. The output can then be used as the classification for the corresponding patch in the input image.

At block 440, the system can generate an output classification for the input image based on the classifications of each patch. For example, as discussed above, the system may classify the image as "appropriately distanced" only if all patches are thusly classified with sufficient confidence. In some embodiments, if any patches are not classified as "appropriate distance", or if any patches are associated with a confidence below some threshold, the system can classify the image based on the non-AD patch(es). For example, if one patch is labeled as "reduced distance," the system may classify the entire image as depicting reduced distance.

As discussed above, these patch-specific or image-specific classifications can be used for a variety of tasks.

Figure 5:
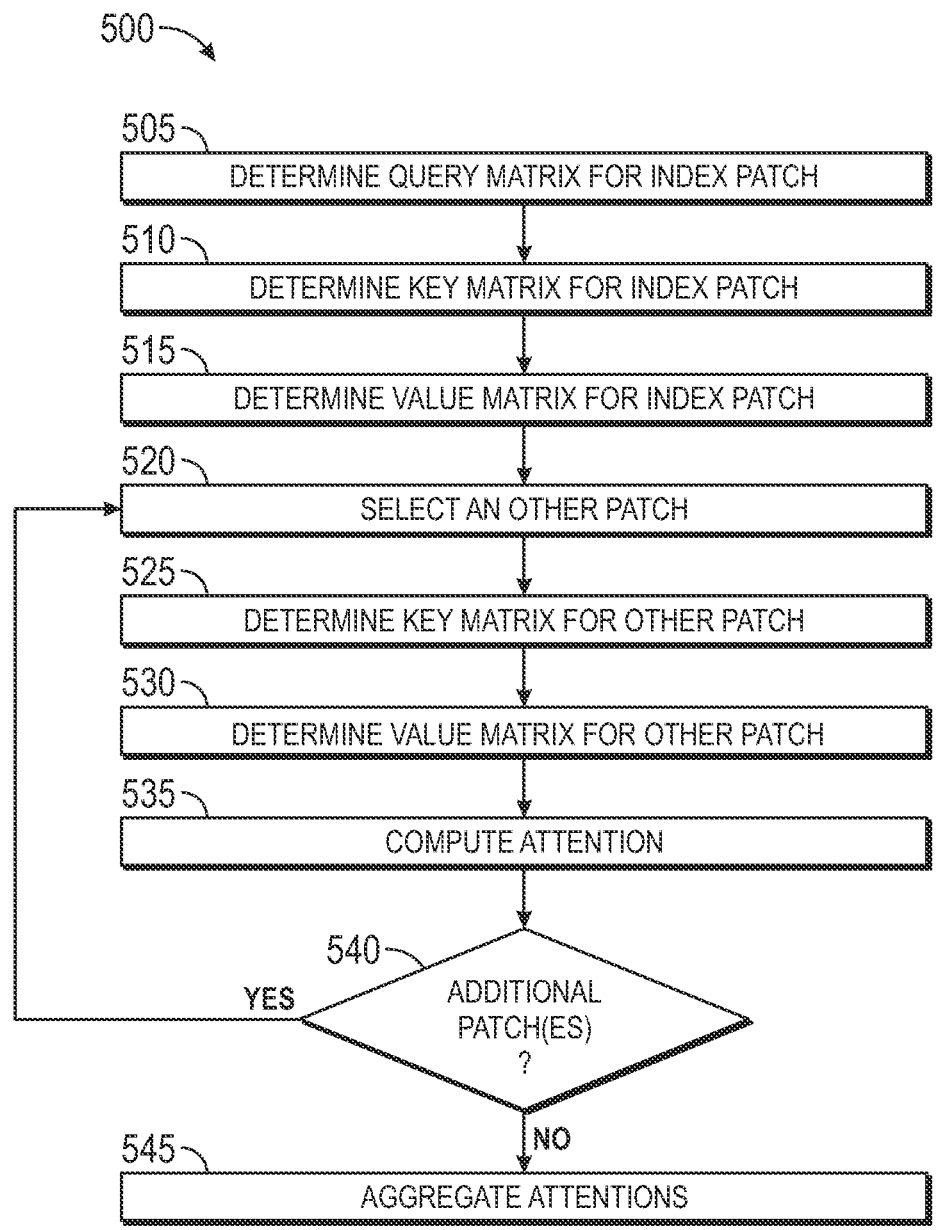
FIG. 5 is a flow diagram depicting an example method for computing attention using a distance classifier, according to some embodiments described herein.

FIG. 5 is a flow diagram depicting an example method 500 for computing attention using a distance classifier, according to some embodiments described herein. In some embodiments, the method 500 may provide additional detail for block 425 of FIG. 4. In some embodiments, the method 500 is performed using the encoder 225 of FIG. 2.

The method 500 generally depicts generation of an overall attention (or transformed feature tensor) for a single patch, which is referred to as an index patch for clarity. In embodiments, the method 500 is performed for all patches in the image, either sequentially or in parallel.

At block 505, a query matrix is determined for the index patch. As discussed above, in some embodiments, determining the query matrix includes multiplying the feature tensor of the index patch with a query weight matrix. The query weight matrix includes a set of learned weights that were modified or refined using training data, as discussed below in more detail.

At block 510, a key matrix is determined for the index patch. In some embodiments, determining the key matrix includes multiplying the feature tensor of the index patch with a key weight matrix, which specifies a set of learned weights that were modified or refined using training data, as discussed below in more detail.

At block 515, a value matrix is determined for the index patch. In a similar manner to the query matrix and key matrix, the value matrix can be determined by multiplying the feature tensor of the index patch with a value weight matrix, which specifies a set of learned weights that were modified or refined using training data, as discussed below in more detail.

Though not included in the illustrated example for conceptual clarity, in some embodiments, the system can similarly generate a respective query matrix, a respective key matrix, and a respective value matrix for each respective patch in the image.

At block 520, the system selects one of the other patches in the image. That is, from the set of all patches, the system selects a patch for processing. In some embodiments, as discussed above, the set of patches includes the index patch, such that the system computes an attention of the index patch with respect to itself. In embodiments, this selection can be performed using any suitable criteria, as all other patches will be used to compute the attention of the index patch. Further, though depicted as an iterative process for conceptual clarity, in some aspects, the attention with respect to each other patch can be computed entirely or partially in parallel.

At block 525, the system determines the key matrix of the selected other patch. This may include computing it, or retrieving the pre-computed key matrix. Similarly, at block 530, the system determines the value matrix of the other patch, which may also include computing it or retrieving a pre-computed value matrix.

At block 535, the system then computes the attention of the index patch with respect to the selected other patch. In one embodiment, the system uses equation 1 above to compute this attention. The method 500 then continues to block 540, where the system determines whether there is one or more additional patches that have not yet been used to compute the attention of the index patch.

If so, the method 500 returns to block 520. If not, the method 500 continues to block 545, where the system aggregates all of the patch-specific attentions, computed between the index patch and each other patch in the image, to generate an overall attention or transformed feature tensor for the index patch. This aggregation can generally include a variety of operations, including averaging the attentions, summing the attentions, and the like. In some aspects, as discussed above, the aggregation includes performing an element-wise summation using learned weights.

As discussed above, this transformed feature tensor for the index patch generally encodes the spatial relationships depicted in the patch, and can be used for a variety of tasks, including classification of the patch based on these spatial relationships.

Figure 6:
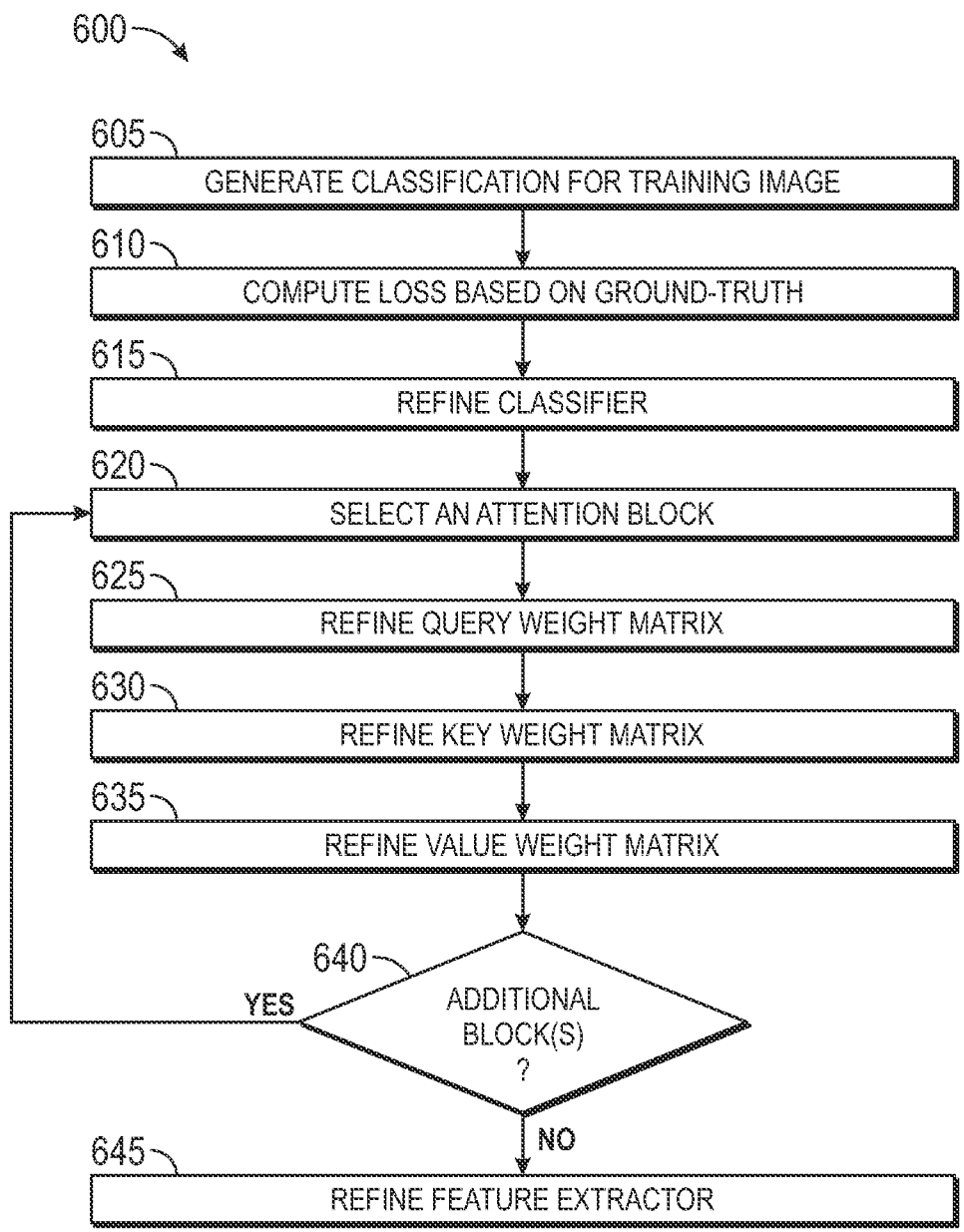
FIG. 6 is a flow diagram depicting an example method for training a distance classifier, according to some embodiments described herein.

FIG. 6 is a flow diagram depicting an example method 600 for training a distance classifier, according to some embodiments described herein. In some embodiments, the method 600 is used to train or refine the distance classifier 115 of FIG. 1. The method 600 may be performed at a variety of stages, including as an initial training process for the model, or as subsequent refinement or fine-tuning (e.g., based on labeled images that are captured during runtime).

At block 605, the system generates a classification for a training image using the distance classifier. For example, the system may use the method 400 of FIG. 4 to generate the classification. As discussed above, this classification may correspond to the entire image, or may be on a per-patch basis.

At block 610, the system computes a loss for the model based on a ground-truth label for the training image. In a similar manner to the classifications, the ground-truth label may correspond to the entire image, or may include ground-truth classifications for each patch. In some embodiments, cross-entropy loss is used. That is, the generated classification(s) and the corresponding ground truth label(s) may be used to compute a cross-entropy loss, which can then be used to refine the model. For example, in one embodiment, the system may use backpropagation to iteratively compute gradients at each layer of the model, and use these gradients to refine the parameters of each layer.

At block 615, the classifier of the model (e.g., the classifier 235 of FIG. 2) is refined based on the loss. For example, the system may compute a set of gradients based on the loss, and refine its parameters based on these gradients. That is, one or more weights or biases of the classifier are refined, such that, after training, the can more accurately classify the input (transformed) feature tensors.

At block 620, the system selects one of the attention blocks in the model (e.g., attention block 315 of FIG. 3). As discussed above, in some aspects, the distance classifier uses a sequence of attention blocks. In some embodiments, the system first selects the final attention block, and iteratively moves towards the first, refining each based on the gradients output from the prior block.

At block 625, the system refines the query weight matrix (or matrices, if a separate set of weight matrices are used for each patch) of the selected attention block based on the gradients from the classifier (or, in the case of an internal attention block, based on the gradients from the subsequent gradient block in the model). That is, the system may generate a set of gradients for the query weight matrix (based on the input gradients and the current values of the weight matrix), and refine the query weight matrix using the set of gradients.

At block 630, the system can similarly refine the key weight matrix (or matrices, if a separate set of weight matrices are used for each patch) of the selected attention block. Further, at block 635, the system refines the value weight matrix (or matrices, if a separate set of weight matrices are used for each patch) of the selected attention block. Although the illustrated example suggests that blocks 625, 630, and 635 as occurring sequentially for conceptual clarity, in some embodiments, these blocks may be performed in parallel.

At block 640, the system determines whether there is at least one additional attention block. If so, the method 600 returns to block 620. If not, the method 600 continues to block 645. Though not included in the method 600 for conceptual clarity, in some aspects, the system can also refine one or more other components of the encoder, such as a positional embedding layer, one or more normalization layers of one or more attention blocks, one or more MLP layers of one or more attention blocks, and the like.

At block 645, the system refines the feature extractor (e.g., feature extractor 215 of FIG. 2). For example, based on the gradients output from the encoder, the system can compute a set of gradients for the feature extractor, and refine its internal weights and biases accordingly. In some embodiments, this also includes refining the learnable class token(s) that are appended or prepended to the feature tensors, as discussed above.

Though the illustrated example depicts refining the model for a single image (e.g., using stochastic gradient descent) for conceptual clarity, in some aspects, the system may refine the model based on a batch of images (e.g., using batch gradient descent).

In embodiments, as discussed above, the method 600 may be used during initial training of the model, as part of a fine-tuning or refinement operation (e.g., because the model accuracy has dropped below a defined threshold), and the like. In some embodiments, a separate distance classifier model is trained or refined for each deployment or location. For example, if the distance classifier is used to monitor distancing in warehouses across different geographic locations, a separate model may be used in each such warehouse. In at least one embodiment, a single model is trained using data from all such locations, and data from each single location (e.g., from a single warehouse, or from a single camera) can be used to refine a corresponding instance of the model. In other aspects, the model is trained for all such deployments, and is used by all deployments in the same configuration.

Figure 7:
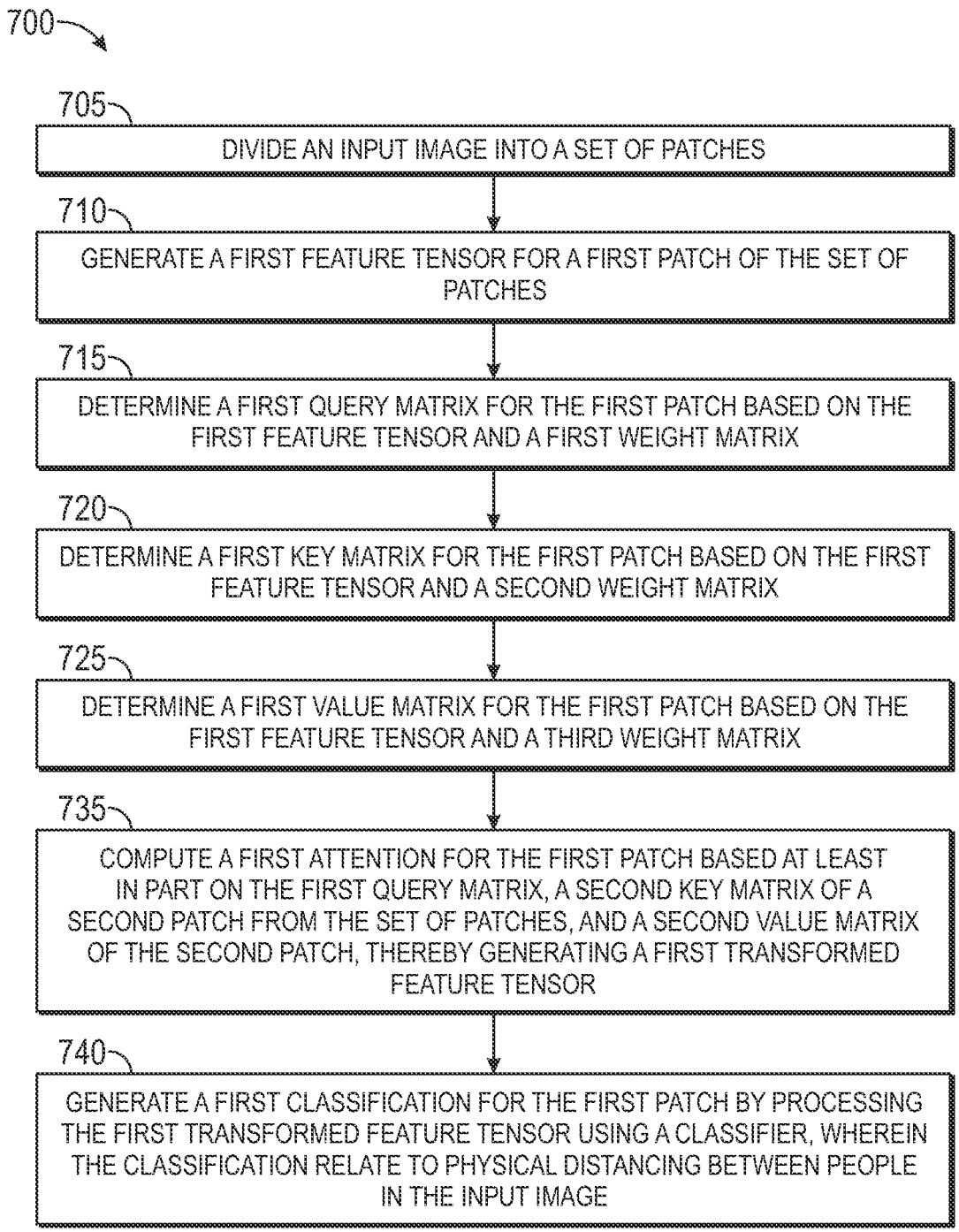
FIG. 7 is a flow diagram depicting an example method for evaluating spatial relationships by processing images using a distance classifier, according to some embodiments described herein.

FIG. 7 is a flow diagram depicting an example method 700 for evaluating spatial relationships by processing images using a distance classifier, according to some embodiments described herein. In some embodiments, the method 700 is performed by the distance classifier 115 of FIG. 1.

At block 705, the distance classifier divides an input image into a set of patches.

At block 710, generates a first feature tensor for a first patch of the set of patches.

At block 715, determines a first query matrix for the first patch based on the first feature tensor and a first weight matrix.

At block 720, determines a first key matrix for the first patch based on the first feature tensor and a second weight matrix.

At block 725, determines a first value matrix for the first patch based on the first feature tensor and a third weight matrix.

At block 730, computes a first attention for the first patch based at least in part on the first query matrix, a second key matrix of a second patch from the set of patches, and a second value matrix of the second patch, thereby generating a first transformed feature tensor.

At block 735, generates a first classification for the first patch by processing the first transformed feature tensor using a classifier, wherein the classification relate to physical distancing between people in the input image.

Figure 8:
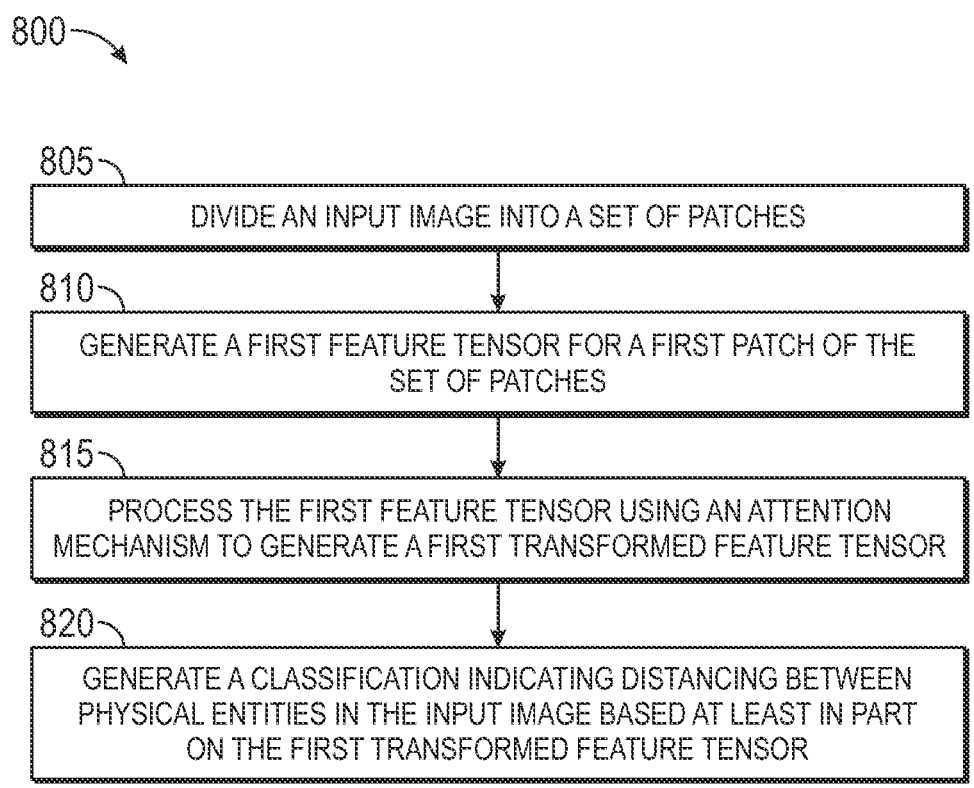
FIG. 8 is a flow diagram depicting an example method for classifying images using a distance classifier, according to some embodiments described herein.

FIG. 8 is a flow diagram depicting an example method 800 for classifying images using a distance classifier, according to some embodiments described herein. In some embodiments, the method 800 is performed by the distance classifier 115 of FIG. 1.

At block 805, divides an input image into a set of patches.

At block 810, generates a first feature tensor for a first patch of the set of patches.

At block 815, processes the first feature tensor using an attention mechanism to generate a first transformed feature tensor.

At block 820, generates a classification indicating distancing between physical entities in the input image based at least in part on the first transformed feature tensor.

Figure 9:
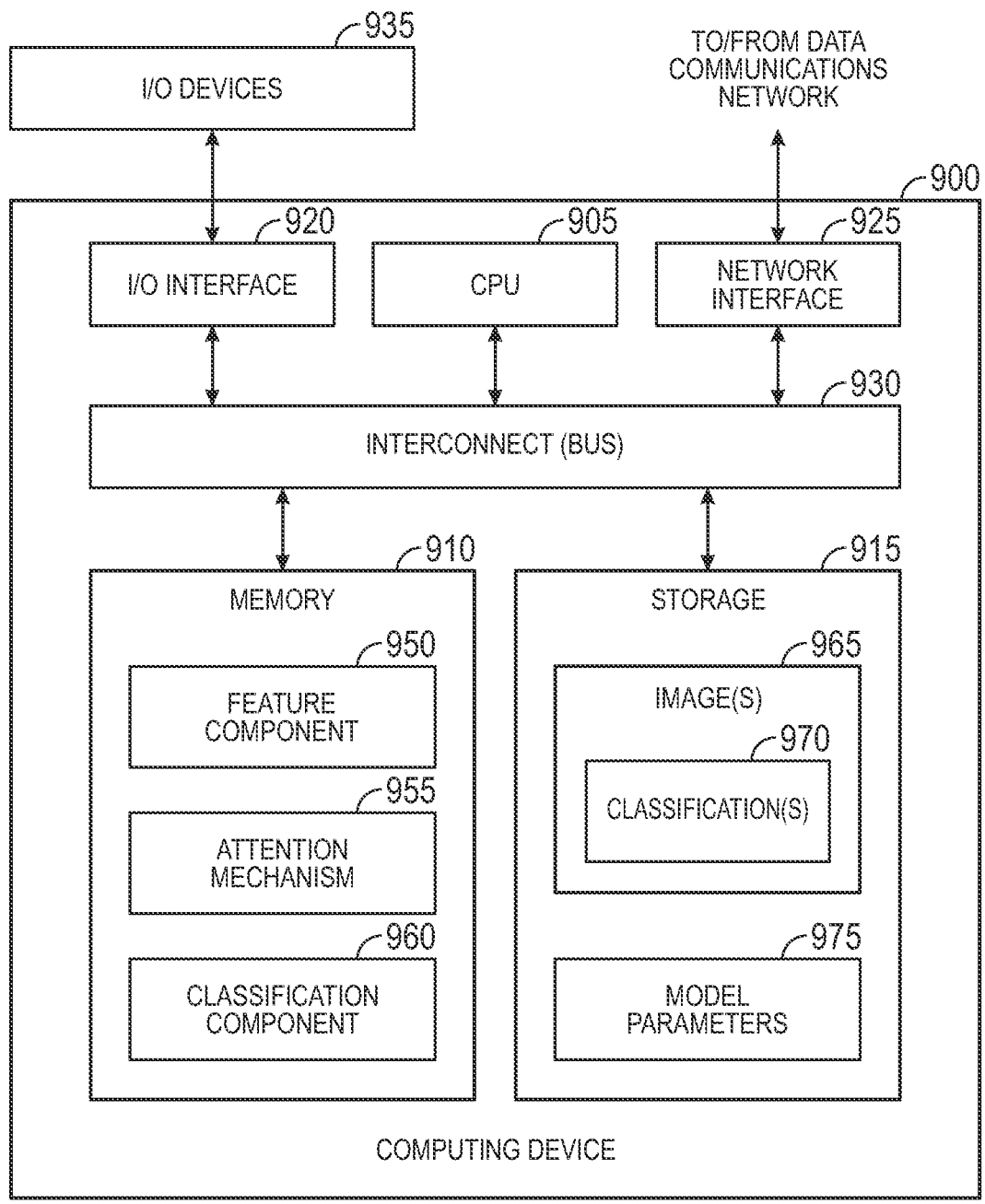
FIG. 9 is a block diagram depicting an example computing device for processing images, according to some embodiments described herein.

FIG. 9 is a block diagram depicting an example computing device 900 for processing images, according to some embodiments described herein.

Although depicted as a physical device, in embodiments, the computing device 900 may be implemented as a virtual device or service, and/or across a number of devices (e.g., in a cloud environment). In at least one embodiment, a separate computing device 900 is used for each geographic location (e.g., with a separate device at each warehouse, enabling faster local processing of the images). As illustrated, the computing device 900 includes a CPU 905, memory 910, storage 915, one or more I/O interfaces 920, and a network interface 925. The components are interconnected via one or more interconnects 930.

In the illustrated embodiment, the CPU 905 retrieves and executes programming instructions stored in memory 910, as well as stores and retrieves application data residing in storage 915. The CPU 905 is generally representative of a single CPU and/or GPU, multiple CPUs and/or GPUs, a single CPU and/or GPU having multiple processing cores, and the like. The memory 910 is generally included to be representative of a random access memory. Storage 915 may be any combination of disk drives, flash-based storage devices, and the like, and may include fixed and/or removable storage devices, such as fixed disk drives, removable memory cards, caches, optical storage, network attached storage (NAS), or storage area networks (SAN).

In some embodiments, I/O devices 935 (such as a mouse, a keyboard, a monitor, a touchscreen, etc.) are connected via the I/O interface(s) 920. Further, via the network interface 925, the computing device 900 can be communicatively coupled with one or more other devices and components (e.g., directly or via one or more network, which may include the Internet, local network(s), and the like).

In the illustrated embodiment, the storage 915 includes a set of images 965, each with an associated classification 970, and a set of model parameters 975. Although depicted as residing in storage 915, the images 965 and model parameters 975 may reside in any suitable location. For example, the images 965 may reside in a cloud storage repository, and the model parameters 975 may be maintained in memory 910 for processing input images.

Generally, the images 965 correspond to images that have been processed by the computing device 900, and the classifications 970 may include the generated classification(s), human-curated annotations, or a combination of the two. In some embodiments, the images 965 and classifications 970 can be used to determine distancing metrics (e.g., distancing metrics 135 in FIG. 1), to refine or fine-tune the model, and the like.

The model parameters 975 generally correspond to the weights, biases, other parameters, and hyperparameters used to define the distance classifier (e.g., the distance classifier 115 of FIG. 1). Generally, the computing device 900 can use the model parameters 975 to instantiate a distance classifier for processing received images. For example, the model parameters 975 may include the learned parameters of a feature extractor (e.g., feature extractor 215 of FIG. 2) which may include learnable class tokens, an encoder (e.g., encoder 225 of FIG. 2) which may include a positional embedding layer (e.g., positional embedding layer 310 of FIG. 3), normalization layers (e.g., normalization layers 320 and 330 of FIG. 3), an attention layer (e.g., attention layer 325 of FIG. 3) which may include a query weight matrix, key weight matrix, and value weight matrix, a classifier (e.g., classifier 235 of FIG. 2), and the like.

In the illustrated embodiment, the memory 910 includes a feature component 950, an attention mechanism 955, and a classification component 960. The feature component 950, attention mechanism 955, and classification component 960 are generally configured to perform one or more of the embodiments discussed herein. Although depicted as software residing in memory 910, in embodiments, the functionality of the feature component 950, attention mechanism 955, and classification component 960 may be implemented using software, hardware, or a combination of software and hardware. Further, although depicted as discrete components for conceptual clarity, in embodiments, the operations of the feature component 950, attention mechanism 955, and classification component 960 may be combined or distributed across any number of components and devices.

Generally, the feature component 950 is used to generate feature tensors for input image patches, as discussed above. For example, the feature component 950 may correspond to the feature extractor 215 of FIG. 2. The attention mechanism 955 is generally used to compute attentions for each patch based on the feature tensors generated by the feature component 950, as discussed above. For example, the attention mechanism 955 may correspond to the encoder 225 of FIG. 2. The classification component 960 is generally configured to classify the tensors generated by the attention mechanism 955, as discussed above. For example, the classification component 960 may correspond to the classifier 235 of FIG. 2.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements described herein, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages described herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the FIGS. illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the FIGS. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications or components (e.g., such as the distance classifier 115 of FIG. 1) or related data available in the cloud. For example, the distance classifier 115 could be stored or execute on a computing system in the cloud and classify input images based on distancing. In such a case, the distance classifier 115 could process received images and store the classifications at a storage location in the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A computer-implemented method of classifying input images based on physical distancing between people, comprising:
   dividing an input image into a set of patches;
   generating a first feature tensor for a first patch of the set of patches;
   processing the first feature tensor using an attention mechanism to generate a first transformed feature tensor, comprising:
   determining a first query matrix for the first patch based on the first feature tensor and a first weight matrix;
   determining a first key matrix for the first patch based on the first feature tensor and a second weight matrix;
   determining a first value matrix for the first patch based on the first feature tensor and a third weight matrix; and
   computing a first attention for the first patch based at least in part on the first query matrix, a second key matrix of a second patch from the set of patches, and a second value matrix of the second patch; and generating a first classification for the first patch by processing the first transformed feature tensor using a classifier, wherein the classification relate to physical distancing between people in the input image.

2. The computer-implemented method of claim 1, wherein:
    generating the first feature tensor comprises processing the first patch using a convolution kernel,
    the method further comprising, prior to processing the first feature tensor using the attention mechanism:
        appending a learned class token to the first feature tensor; and
        processing the first feature tensor using a positional embedding layer.

3. The computer-implemented method of claim 1, further comprising training the attention mechanism, comprising:
    computing a loss based on the first classification and a ground-truth label for the first patch; and
    refining the first, second, and third weight matrices based on the loss.

4. The computer-implemented method of claim 1, wherein computing the first attention comprises computing an attention for the first patch with respect to the second patch according to $a_1=\text{softmax}(Q_i*K_j)*V_j$, wherein:
    $a_1$ is the attention for the first patch with respect to the second patch,
    $Q_i$ is the first query matrix,
    $K_j$ is the second key matrix, and
    $V_j$ is the second value matrix.

5. The computer-implemented method of claim 1, further comprising:
    classifying each respective patch of the set of patches using the classifier;
    generating an output classification for the input image based on the classifications of each respective patch in the set of patches; and
    outputting the output classification, wherein the output classification comprises a confidence value and an indication that:
        (i) the input image depicts appropriate distance between people,
        (ii) the input image depicts reduced distance between people,
        (iii) the input image depicts less than two people, or
        (iv) it is unclear how distanced people in the input image are.

6. A computer-implemented method, comprising:
    dividing an input image into a set of patches;
    generating a first feature tensor for a first patch of the set of patches;
    processing the first feature tensor using an attention mechanism to generate a first transformed feature tensor; and
    generating a classification indicating distancing between physical entities in the input image based at least in part on the first transformed feature tensor.

7. The computer-implemented method of claim 6, further comprising:
    prior to processing the first feature tensor using the attention mechanism, appending a learned class token to the first feature tensor.

8. The computer-implemented method of claim 6, further comprising:
    prior to processing the first feature tensor using the attention mechanism, processing the first feature tensor using a positional embedding layer.

9. The computer-implemented method of claim 6, wherein processing the first feature tensor using an attention mechanism comprises:
    determining a first query matrix for the first patch based on the first feature tensor and a first weight matrix;
    determining a first key matrix for the first patch based on the first feature tensor and a second weight matrix; and
    determining a first value matrix for the first patch based on the first feature tensor and a third weight matrix.

10. The computer-implemented method of claim 9, wherein the first, second, and third weight matrices are learned during training of the attention mechanism.

11. The computer-implemented method of claim 9, wherein processing the first feature tensor using an attention mechanism comprises:
    computing a first attention for the first patch based at least in part on the first query matrix, a second key matrix of a second patch from the set of patches, and a second value matrix of the second patch.

12. The computer-implemented method of claim 6, further comprising, for each respective patch in the set of patches, computing an attention with respect to each other patch in the set of patches.

13. The computer-implemented method of claim 6, wherein generating the classification comprises:
    generating a respective classification for each respective patch of the set of patches; and
    generating the classification for the input image based on the respective classifications of each respective patch, wherein the classification for the input image indicates that:
        (i) the input image depicts appropriate distance between physical entities,
        (ii) the input image depicts reduced distance between physical entities,
        (iii) the input image depicts less than two physical entities, or
        (iv) it is unclear how distanced physical entities in the input image are.

14. A non-transitory computer readable medium comprising computer readable code executable by one or more processors to perform an operation comprising:
    dividing an input image into a set of patches;
    generating a first feature tensor for a first patch of the set of patches;
    processing the first feature tensor using an attention mechanism to generate a first transformed feature tensor; and
    generating a classification indicating distancing between physical entities in the input image based at least in part on the first transformed feature tensor.

15. The non-transitory computer readable medium of claim 14, the operation further comprising, prior to processing the first feature tensor using the attention mechanism:
    appending a learned class token to the first feature tensor; and
    processing the first feature tensor using a positional embedding layer.

16. The non-transitory computer readable medium of claim 14, wherein processing the first feature tensor using an attention mechanism comprises:
    determining a first query matrix for the first patch based on the first feature tensor and a first weight matrix;
    determining a first key matrix for the first patch based on the first feature tensor and a second weight matrix; and
    determining a first value matrix for the first patch based on the first feature tensor and a third weight matrix.

17. The non-transitory computer readable medium of claim 16, wherein the first, second, and third weight matrices are learned during training of the attention mechanism.

18. The non-transitory computer readable medium of claim 16, wherein processing the first feature tensor using an attention mechanism comprises:
  computing a first attention for the first patch based at least in part on the first query matrix, a second key matrix of a second patch from the set of patches, and a second value matrix of the second patch.

19. The non-transitory computer readable medium of claim 14, wherein the operation is agnostic with respect to a configuration used by an imaging sensor used to capture the input image.

20. The non-transitory computer readable medium of claim 14, wherein generating the classification comprises:
  generating a respective classification for each respective patch of the set of patches; and
  generating the classification for the input image based on the respective classifications of each respective patch, wherein the classification for the input image indicates that:
    (i) the input image depicts appropriate distance between physical entities,
    (ii) the input image depicts reduced distance between physical entities,
    (iii) the input image depicts less than two physical entities, or
    (iv) it is unclear how distanced physical entities in the input image are.

* * * * *